R. H. ST. JOHN.
Watchmakers' Lathe.
No. 18,213.
Patented Sept. 15, 1857.
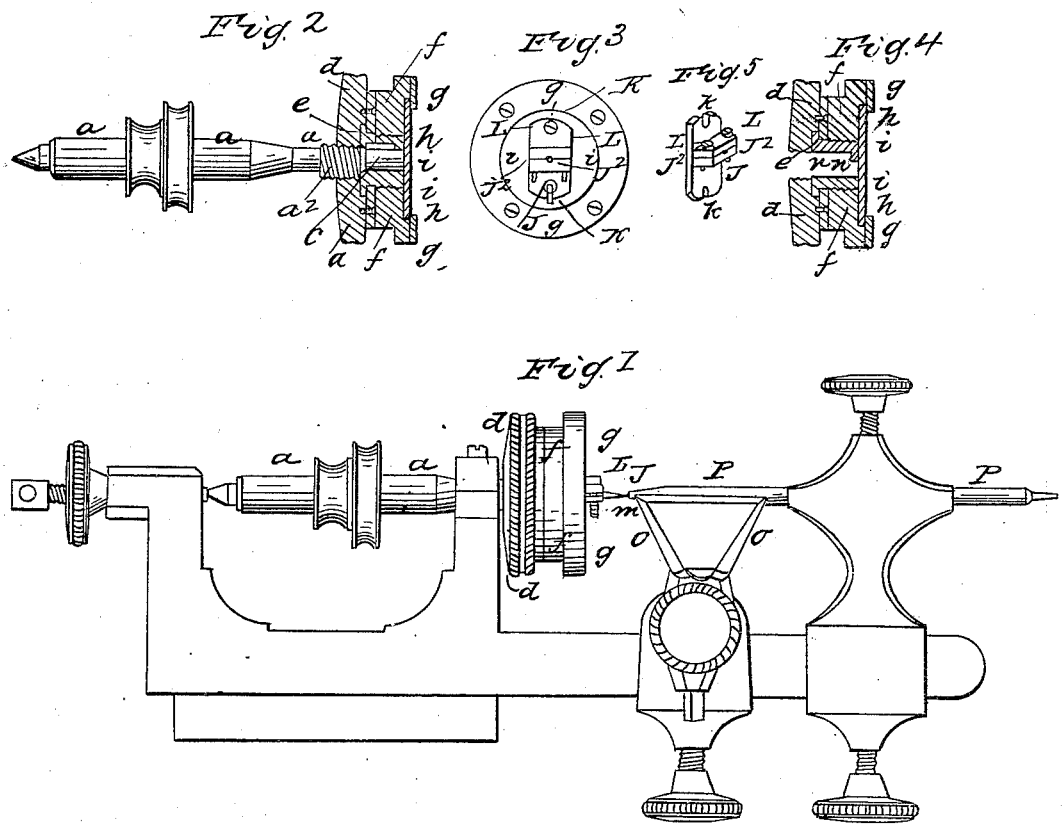

UNITED STATES PATENT OFFICE.

ROSWELL H. ST. JOHN, OF BELLEFONTAINE, OHIO.

WATCHMAKER'S LATHE.

Specification of Letters Patent No. 18,213, dated September 15, 1857.

*To all whom it may concern:*

Be it known that I, R. H. St. John, of Bellefontaine, in the county of Logan and State of Ohio, have invented, made, and used certain new and useful Improvements in Lathes for Watchmakers; and I do hereby declare that the following is a full, clear, and exact description of the same, reference being had to the accompanying drawings, making a part of this specification, in which—

Figure 1, is a front, or longitudinal view of the lathe complete. Fig. 2, is a sectional view of the improved chuck and mandrel attachment. Fig. 3 is a front view of the chuck. Fig. 4, sectional view of chuck. Fig. 5, jaws of the chuck.

The nature of my improvements, consists in constructing a lathe mandrel $a$, $a$, $a$, with a key part $b$, and short shank or extended part $c$, Fig. 2, together with a chuck constructed and formed of a jam disk $d$, $d$, a tubular clutch collar, or ward bush $c$, $c$, formed with screw thread and attached to a sectional disk $f$, $f$, having a ring or annular plate $g$, $g$, screwed on to the front of the chuck as shown in Fig. 3. The front face of the disk $f$, $f$, is turned out forming a depression, while the ring, or annular plate $g$, $g$, is something less in diameter at its inner circumference, thus forming a projection or flange edge as at $h$, $h$, and a circular space between the depression and the flange edge. In this depression, is fitted a thin disk, or plate $i$, $i$, which plate is to be from one-eighth inch, to a one-fourth of an inch more or less, smaller in diameter than the depression. To this movable plate or disk is screwed suitable jaw-clamps J, J, Figs. 1, 3, 5. These jaws are each formed at their ends, with short slots $k$, $k$, by which the jaws are held against the face of the disk or movable plate $i$, $i$. Small screws are employed to hold the jaws in position. Through the lips of the jaws, pass suitable tightening screws, as at L, L, Figs. 1, 3, 5. These lips of the jaws are grooved or indented so as to admit the center point $m$ as at Fig. 1.

The application and use of my improvements are as follows, viz: The chuck is screwed on to the screw or mandrel end $a^2$, and, as the jam disk $d$, $d$, tightens up, the shank or key end of the mandrel catches in the ward $n$ $n$ formed in the sectional disk as shown in Fig. 4, and this sectional disk is independent, or separate from the jam disk $d$, $d$, but both are held together by the tubular clutch or ward bush $e$, $e$. In inserting the center point $m$, the screws L, L, are loosened, and the butt of the point inserted in the opening formed by the grooves of the lips $J^2$—$J^2$. Now in order to obtain the desired center of the article placed in the lathe, and to true it up to its required position, all that is necessary is to loosen the jam disk $d$, when on the mandrel, and this enables the loosening also of the centering disk or plate $i$, $i$, and adjusting the slide rest $o$, $o$ to the required position the piece of metal, or article to be trued, is arranged between the center point $m$, and the sliding mandrel P P, and by taking in hand a suitable, small piece of wood it is applied against the side of the center point, and as the chuck is made to revolve, by regulating the pressure of the piece of wood the article in the lathe may be readily brought to a true horizontal position, at which point, the screw jam disk is tightened, which tightening, effectually draws up the disk $f$, $f$, and brings the centering plate $i$, flush up against the shank or key part of the mandrel, C, which holds the plate $i$, $i$, and prevents its slipping out of true. The screws, working in the slots $k$, $k$, enable the adjustment of the jaws up or down when required.

The great simplicity of construction and facility with which my chuck and mandrel improvements are applied and used, and the great accuracy with which an article may be trued in the lathe render many advantages to watchmakers, that all other improvements heretofore used are not susceptible of affording to the same extent.

What I claim as new and desire to secure by Letters Patent of the United States is—

The construction of the chuck, Figs. 2, 3, 4, 5, formed of the jam disk $d$, $d$, the tubular clutch collar or ward bush $e$, $e$ with the centering plate $i$, $i$, and adjustable jaws J, K, L, together and combined with a keying mandrel $a^2$, $b$, C, substantially as shown and described.

ROSWELL H. ST. JOHN. [L. S.]

Witnesses:
William Miller,
S. G. Hoge.